United States Patent Office 3,310,526
Patented Mar. 21, 1967

3,310,526
CYCLOPOLYSILOXANES
Christian R. Sporck, Burnt Hills, N.Y., assignor to General Electric Company, a corporation of New York
No Drawing. Filed Dec. 18, 1961, Ser. No. 160,263
3 Claims. (Cl. 260—46.5)

This invention relates to organocyclotrisiloxanes of high phenyl content and to polymers and copolymers prepared therefrom.

It is well known in the organosilicon chemistry art that polymeric organosiloxanes in which some of the silicon-bonded organic groups are phenyl groups exhibit certain desirable properties as compared with the corresponding properties of methyl polysiloxanes. For example, the presence of silicon-bonded phenyl groups provides increased thermal stability, particularly in oxidizing atmospheres, and increases resistance to high energy electron irradiation and to pile irradiation.

Despite these known advantages derived from the incorporation of silicon-bonded phenyl groups in organopolysiloxanes it has been difficult, if not impossible, to prepare useful high molecular weight linear organopolysiloxanes in which all of the organo groups are phenyl groups. When polymers are made, for example, by the polymerization of hexaphenylcyclotrisiloxane or octaphenylcyclotetrasiloxane, the resulting materials are hard, intractable polymers which are difficult to form into the desired shapes.

The present invention is based on my discovery of a specific class of cyclic organopolysiloxanes which can be polymerized to high molecular weight thermoplastic, linear organopolysiloxanes which can be readily molded into the desired shape to form articles which are resistant to changes caused by ionizing radiation. The polymers prepared by the polymerization of the cyclopolysiloxanes of the present invention are characterized by all of the organo groups being phenyl groups. In particular, the cyclopolysiloxanes of the present invention have the formula:

(1) 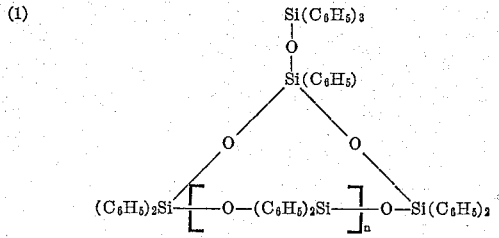

where $n$ is a whole number equal to from 0 to 1, inclusive. The cyclopolysiloxanes of Formula 1 can be polymerized to form the high molecular weight materials of the present invention which consist essentially of recurring units having the formula:

(2) —$(C_6H_5)_2Si$—O—$(C_6H_5)_2Si$—O—$(C_6H_5)_2Si$—
—O—$(C_6H_5)[(C_6H_5)_3SiO]Si$—O— where $n$ is as previously defined. In addition, the cyclopolysiloxanes of Formula 1 can be copolymerized with other cyclic polydiorganosiloxanes to form a number of copolymers.

As is apparent from Formula 1, there are two cyclopolysiloxanes within the scope of the present invention. These are triphenylsiloxy pentaphenylcyclotrisiloxane and triphenylsiloxy heptaphenylcyclotetrasiloxane. These cyclopolysiloxanes are prepared by effecting reaction between an hydroxy chain-stopped polydiphenylsiloxane having the formula:

(3) HO—$(C_6H_5)_2Si$—O—$(C_6H_5)_2Si$—O—$(C_6H_5)_2Si$—OH where $n$ is as previously defined, and a phenyl triphenylsiloxydihalogenosilane having the formula:

(4)     $(C_6H_5)[(C_6H_5)_3SiO]SiX_2$ where X is halogen, e.g., chlorine, bromine, etc., and preferably chlorine. It is apparent that Formula 3 encompasses two compounds, namely tetraphenyldisiloxanediol-1,3 and hexaphenyltrisiloxanediol-1,5.

The reaction to form the cyclopolysiloxanes of Formula 1 theoretically involves one mole of the hydroxyl chain-stopped material of Formula 3 and one mole of the dihalogenosilane of Formula 4 and results in the formation of two moles of hydrogen halide. To facilitate the reaction a hydrogen halide acceptor is employed. Suitable hydrogen halide acceptors are any organic tertiary amine, e.g., pyridine, triethyl amine, N,N-dimethyl aniline, etc. In theory, one mole of the hydrogen halide acceptor is required for each mole of hydrogen halide generated. While the theoretical ratio of reactants has been described above, the ratio of these ingredients can vary within wide limits. For example, the hydroxyl chain-stopped material of Formula 3 can be employed in an amount equal to form about 0.5 to 2 moles per mole of the dihalogenosilane of Formula 4. Preferably, the hydrogen halide acceptor is employed in excess, with there being from about 3 to 30 moles of hydrogen halide acceptor per mole of whichever of the other reactants is present in the smaller amount. Preferably, the hydroxy chain-stopped material of Formula 3 and the dihalogenosilane of Formula 4 are employed in equimolar amounts to reduce the formation of by-products. The use of equimolar amounts simplifies the purification of the desired cyclopolysiloxane since no significant amount of unreacted starting materials are left in the reaction mixture.

Because the hydroxy chain-stopped polydiphenyl siloxanes of Formula 3 and the cyclopolysiloxanes of Formula 1 are solid materials at room-temperature, it is preferable to effect the reaction of the present invention in the presence of a solvent which is inert to the reactants under the conditions of the reaction and which is a solvent for all of the reactants and the reaction products except the hydrohalide of the hydrogen halide acceptor. Suitable solvents include tetrahydrofuran, tetrahydropyran, n-hexane, xylene, diethyl ether and toluene. In general, the solvent is employed in the ratio of from about 1 to 50 parts by weight, based on the total weight of the other components of the reaction mixture.

Because the reaction to form the cyclopolysiloxanes of Formula 1 proceeds at a satisfactory rate at room temperature, it is preferred to conduct the reaction at such temperature, i.e., a temperature of from about 15 to 25° C. However, it should be understood that the use of elevated temperatures, e.g., temperatures of from about 25 to 120° C. is not precluded. Depending upon the proportions of ingredients, the reaction temperature and the particular solvent employed, the time required for effecting reaction between the hydroxyl chain-stopped polydiphenylsiloxane of Formula 3 and the dihalogenosilane of Formula 4 can vary from about one hour to 24 hours or more.

After the reaction is completed, the reaction mixture consists of a solution of the cyclopolysiloxane of Formula 1 together with any unreacted starting materials and a hydrohalide precipitate. This precipitate is filtered from the reaction mixture and the resulting filtrate is stripped of solvent and volatile starting materials, resulting in a crude product. The crude product is recrystallized from a suitable solvent such as benzene, hexane, ethanol, n-butanol, cyclohexane, or mixtures thereof to produce a purified cyclopolysiloxane of Formula 1.

Polymeric materials consisting essentially of the recurring unit of Formula 2 can be formed by the polymerization of the cyclopolysiloxanes of Formula 1 by several methods. For example, the cyclopolysiloxanes can be polymerized by heat alone, employing a temperature of about 250 to 350° C., preferably in an inert atmosphere such as nitrogen or a noble gas. Polymerization can be effected at these temperatures in about 15 minutes to four hours, during which time one of the siloxane bonds of the cyclopolysiloxane opens up and permits a conventional rearrangement and condensation to form a polymeric material which is a hard, thermoplastic polymer at room temperature and a viscous, moldable gum at temperatures in excess of 50° C. This polymer is soluble in benzene and toluene. This polymer can contain from about 15 up to 7,000 or more, and preferably from about 150 to 7,000 or more of the units of Formula 2 depending upon the reaction temperature and time. In general, these polymers have an intrinsic viscosity of the order of from about 0.25 to 4.0 deciliters per gram when measured in toluene at 30° C. and have molecular weights of the order of from about 10,000 to 5,000,000 or more.

Another and preferred method of forming the polymers of the present invention is by the catalytic rearrangement and condensation of the cyclopolysiloxanes of Formula 1. This rearrangement and condensation is effected in the presence of a typical alkaline organopolysiloxane rearrangement and condensation catalyst such as potassium hydroxide. The rearrangement and condensation catalyst is conventionally added to the cyclopolysiloxane as a solution in octamethylcyclotetrasiloxane, for example, as a solution containing from about 0.1 percent to 1.0 percent by weight potassium hydroxide. In general, the amount of potassium hydroxide added is sufficient to provide about 10 to 100 parts by weight potassium hydroxide per million parts by weight of the cyclopolysiloxane. The catalytic polymerization is effected by heating the mixture of potassium hydroxide and the cyclopolysiloxane at a temperature above the melting point of the cyclopolysiloxane so as to insure thorough mixing of the catalyst with the cyclic material. In general, the polymerization is effected at a temperature of from about 150 to 180° C. with the polymerization being completed in a time of from a few seconds up to one hour or more. The polymers resulting from this base catalyzed polymerization are identical to those produced by the thermopolymerization previously described.

In addition to forming polymers of the cyclopolysiloxanes of Formula 1 alone, copolymers can be prepared by reacting the cyclpolysiloxanes of Formula 1 with other cyclic polydiorganosiloxanes. Preferably, in preparing these copolymers, the base catalyzed rearrangement and condensation reaction described above is employed.

Suitable cyclic polydiorganosiloxanes for copolymerization with the cyclopolysiloxanes of Formula 1 include, for example, hexaphenylcyclotrisiloxane, octaphenylcyclotetrasiloxane, hexamethylcyclotrisiloxane or octamethylcyclotetrasiloxane; 1,1 - dimethyl - 3,3,5,5 - tetraphenylcyclotrisiloxane which is described and claimed in my copending application Ser. No. 160,264, now abandoned; 1,1-dimethyl-3,3,5,5,7,7-hexaphenylcyclotetrasiloxane which is described and claimed in the copending application of Howard A. Vaughn, Jr., Ser. No. 160,267, now abandoned; 1,1,-bis-(p-chlorophenyl)-3,3,5,5-tetraphenylcyclotrisiloxane or p-chlorophenylheptaphenylcyclotetrasiloxane which are described and claimed in my copending application Serial No. 160,265; methylpentaphenylcyclotrisiloxane or methylheptaphenylcyclotetrasiloxane which are described and claimed in my copending application Serial No. 160,270; 1-methyl-1-(beta-cyanoethyl)-3,3,5,5-tetraphenylcyclotrisiloxane or gamma-cyanopropylheptaphenylcyclotetrasiloxane which are described and claimed in my copending application Serial No. 160,271; compounds such as 1,1-bis-(trifluoromethylphenyl)-3,3,5,5-tetraphenylcyclotrisiloxane which are described and claimed in my copending application Ser. No. 160,272; cyclic materials containing both siloxane linkages and silphenylene linkages such as are described and claimed in my copending application Ser. No. 160,262; vinylpentaphenylcyclotrisiloxane or vinylheptaphenylcyclotetrasiloxane which are described in my copending application Ser. No. 160,268; and 1-methyl-1-vinyl-3,3,5,5-tetraphenylcyclotrisiloxane or 1 - methyl - 1 - vinyl - 3,3,-5,5,7,7-hexaphenylcyclotetrasiloxane which are described and claimed in my copending application Ser. No. 160,269. All of the aforementioned copending applications are filed concurrently herewith and assigned to the same assignee as the present invention.

The copolymerization of the cyclopolysiloxanes of Formula 1 with the aforementioned other cyclic polydiorganosiloxanes results in high molecular weight polysiloxanes which are tough, clear materials and which are soluble in solvents such as benzene and toluene. When copolymeric organopolysiloxanes are prepared by copolymerizing the cyclopolysiloxanes of Formula 1 with other cyclopolysiloxanes, the procedure employed is identical to that employed in preparing the polymers within the scope of Formula 2. The ratio of the various cyclopolysiloxanes used in the preparation of the copolymers can vary without limit, depending upon the characteristics desired in the final copolymeric materials. Satisfactory cyclopolysiloxane mixtures can contain from 1.0 to 99 percent by weight of the cyclopolysiloxanes of Formula 1 based on the total weight of the cyclopolysiloxanes in the mixture.

Because all of the organo groups in the polymers consisting essentially of the recurring structural units of Formula 2 are phenyl groups, it is not possible to crosslink these materials by conventional means such as ionizing radiation or free-radical chemical catalysts. However, many of the copolymers prepared by the rearrangement and condensation of the cyclic materials of Formula 1 with other cyclic polydiorganosiloxanes can be crosslinked by conventional means. For example, copolymers containing at least one vinyl group per 100 silicon atoms or containing at least one pair of adjacent methyl-containing silicon atoms per 100 silicon atoms can be crosslinked with either ionizing radiation or by chemical means.

Because the copolymers of the present invention usually have a high phenyl content, the irradiation doses are generally higher than the doses employed in cross-linking conventional methyl silicone rubber. Suitable irradiation doses for cross-linking these copolymers are of the order of from about $100 \times 10^6$ to $1000 \times 10^6$ Roentgens. Preferably, this irradiation is provided by high energy electron bombardment as described and claimed in Patent 2,763,-609—Lawton et al., employing electrons having energies of from about 50,000 to 20,000,000 electron volts. The cross-linking of the polymers and copolymers described above results in the formation of silicone rubber.

Where chemical cross-linking is employed, any of the conventional free-radical cross-linking agents common to the silicone industry can be used. Typical cross-linking agents are, for example, benzoyl peroxide, di-alpha-cumyl peroxide, dichlorobenzoyl peroxide, t-butyl perbenzoate, zirconyl nitrate, etc. These cross-linking agents are added to the copolymers in an amount equal to from about 0.1 to 10% by weight, based on the weight of the copolymer and the catalyzed mixture is heated at an elevated temperature until cross-linking is effected. A suitable curing cycle involves a first cure in a mold in a temperature of about 120 to 150° C. for about 15 to 30 minutes followed by a post-cure for about 16 to 24 hours at a temperature of about 150 to 250° C.

The cross-linking of the copolymers described above, whether by irradiation or chemical means, results in the formation of silicone rubber. The cross-linking can be effected in either the presence or absence of filler materials to produce such silicone rubber. Among the many fillers which can be employed during the cross-linking of the copolymers described above are the various silica fillers such as silica aerogel, fumed silica and precipitated silica as well as other types of fillers such as titanium dioxide, calcium silicate, ferric oxide, chromic oxide, cadmium sulfide, asbestos, glass fibers, calcium carbonate, carbon black, lithopone talc, etc. Preferably, the filler employed in preparing the silicone rubber is a finely divided silica filler. The percentage of filler in the silicone rubber can vary within extremely wide limits. In general, however, the fillers are employed in a ratio of from about 20 to 300 parts by weight filler per 100 parts by weight of the polymer or copolymer.

The silicone rubber described above is useful in all of those applications where conventional silicone rubber is useful and is particularly useful in applications where resistance to irradiation is required, where flexibility over an extremely wide temperature range is required and where an exceptionally high degree of thermal stability, particularly in oxidizing atmospheres, is required. For example, these materials are satisfactory for use as gaskets for automotive transmissions and as oven door seals and the like.

The following examples are illustrative of the practice of my invention and are not intended for purposes of limitation. All parts are by weight.

Triphenylsiloxy phenyldichlorosilane which was used in the examples was prepared by dissolving 635 parts of phenyltrichlorosilane in about 900 parts toluene. Triphenylsilanol (276 parts) was then dissolved in about 500 parts of hot toluene. The hot toluene solution of triphenylsilanol was slowly added to the phenyltrichlorosilane which had previously been heated to its reflux temperature. Toluene was stripped from the reaction product by heating at a temperature of from about 110 to 140° C. under a pressure of from 1 to 11 millimeters. The residue was then charged to a molecular still maintained at a pressure of $10^{-5}$ millimeters. A first fraction was taken off by passing the material through the molecular still at 105° C. A second fraction, which was substantially pure triphenylsiloxy phenyldichlorosilane, was obtained in a pass through the still at 150° C. and $10^{-5}$ millimeters. Chemical analysis of this material showed the presence of 15.7% chlorine, which is the theoretical value for the expected compound. This material was a crystalline solid which melted at about 44–45° C.

Example 1

Into a reaction vessel were added 22.5 parts triphenylsiloxy phenyldichlorosilane, 190 parts of tetrahydrofuran and 24 parts pyridine. To the reaction mixture was then slowly added a solution of 20.7 parts of tetraphenyldisiloxanediol-1,3 in 190 parts of tetrahydrofuran. The mixture was allowed to stand at room temperature for about 16 hours. At the end of this time the pyridine hydrochloride was removed by filtration and the tetrahydrofuran was removed by evaporation to yield a solid material. This solid material was dissolved in boiling toluene and a small precipitate was removed and discarded. Upon standing, crystals precipitated from the toluene solution. These crystals were filtered and recrystallized two additional times to yield a white powdery solid which had a melting point of 146 to 147° C. This crystalline solid was triphenylsiloxy pentaphenylcyclotrisiloxane, having the formula:

(5)
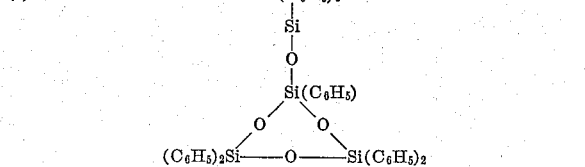

The identity of this material was confirmed by infrared analysis and chemical analysis. Infrared analysis showed a doublet at 8.9 microns and a peak at 13.9 microns corresponding to the diphenylsiloxane units, a peak at 9.8 microns corresponding to the cyclotrisiloxane ring, a peak at 13.6 microns corresponding to the monophenylsiloxy group and a peak at 14.1 microns corresponding to the triphenylsiloxy group. Chemical analysis of this material showed the presence of 73.3 percent C, 5.0 percent H, and 13.6 percent Si; as compared with the theoretical values of 72.8 percent C, 5.1 percent H, and 14.2 percent Si.

Example 2

Following the procedure of Example 1, triphenylsiloxy heptaphenylcyclotetrasiloxane having the formula:

(6)
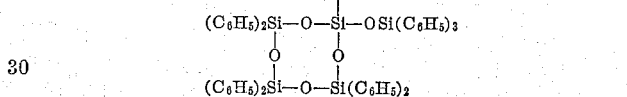

is prepared by adding a solution of 25 parts of hexaphenyltrisiloxanediol-1,5 to a solution of 25 parts of phenyltriphenylsiloxydichlorosilane and 30 parts of pyridine in 250 parts of tetrahydrofuran. After allowing the reaction mixture to stand for 24 hours, the pyridine hydrochloride is removed by filtration and the tetrahydrofuran is evaporated, leaving a solid material. This solid is dissolved in toluene, filtered to remove any impurities, and the filtrate allowed to stand until the desired cyclotetrasiloxane precipitates. This precipitate is recrystallized from toluene to produce a pure white crystalline material corresponding to Formula 6 above.

Example 3

The triphenylsiloxy pentaphenylcyclotrisiloxane of Example 1 is polymerized by heating the material at a temperature of 315° C. for three hours, during which time the siloxane ring opens and a linear polymer is formed which consists essentially of recurring units having the formula:

(7) —$(C_6H_5)_2SiO$—$(C_6H_5)_2SiO$—$(C_6H_5)$
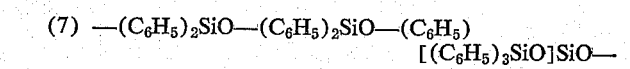
$[(C_6H_5)_3SiO]SiO$—

This material was a hard, thermoplastic polymer which was soluble in toluene. The identity of this material was confirmed by infrared analysis. This polymer had a weight in excess of about 20,000. This polymer is used to encapsulate a transformer by placing the transformer in a container, heating the polymer to 60° C. to soften it, compressed the softened polymer into the voids between the container and the transformer, cooling the assembly to 20° C., and removing the encapsulated transformer from the container.

Example 4

Following the procedure of Example 3, triphenylsiloxy heptaphenylcyclotetrasiloxane is converted to a linear polymer consisting of recurring units having the formula:

(8) —$(C_6H_5)_2SiO$—$(C_6H_5)_2SiO$—$(C_6H_5)_2SiO$—
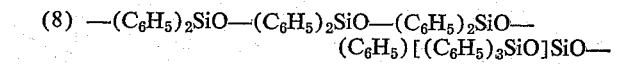
$(C_6H_5)[(C_6H_5)_3SiO]SiO$—

This linear polymer is used to encapsulate a transformer following the procedure of Example 3.

Example 5

A copolymer was prepared by dissolving 82.4 parts of triphenylsiloxy pentaphenylcyclotrisiloxane and 58.2 parts of hexaphenylcyclotrisiloxane in 100 parts toluene. The solution was heated to 120° C. and 0.008 part of potassium hydroxide as a 0.4% solution of potassium hydroxide in octamethylcyclotetrasiloxane was added. After one and one-half hours, the toluene was stripped from the reaction mixture to form a polymer containing repeating units having the formula:

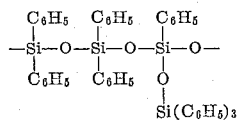

and repeating units having the formula:

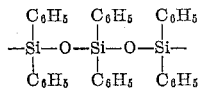

This polymer was a thermoplastic material which was soluble in toluene and benzene and which had a molecular weight in excess of about 20,000.

Example 6

Following the procedure of Example 5, a copolymer is prepared from 100 parts of triphenylsiloxyheptaphenylcyclotetrasiloxane of Formula 6 and octamethylcyclotetrasiloxane. The resulting polymer is a high molecular weight viscous gum which is converted to a silicone rubber by milling 100 parts by weight of the gum with 40 parts by weight of silica aerogel and 5 parts by weight benzoyl peroxide and curing the milled product in a mold at 130° C. for 15 minutes followed by a post-cure at 180° C. for 24 hours.

What I claim as new and desire to secure by Letters Patent of the United States is:

1. An organopolysiloxane consisting essentially of recurring structural units having the formula:

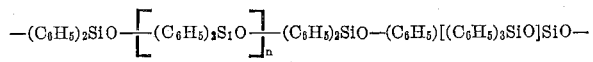

where $n$ is a whole number equal to from 0 to 1, inclusive, said organopolysiloxane having a molecular weight of at least about 10,000.

2. An organopolysiloxane consisting essentially of recurring structural units having the formula:

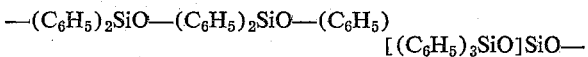

said organopolysiloxane having a molecular weight of at least about 10,000.

3. An organopolysiloxane consisting essentially of recurring structural units having the formula:

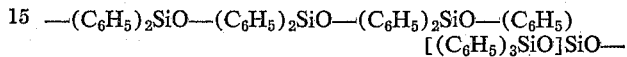

said organopolysiloxane having a molecular weight of at least about 10,000.

References Cited by the Examiner

UNITED STATES PATENTS

| | | | |
|---|---|---|---|
| 2,486,162 | 10/1949 | Hyde | 260—448.2 |
| 2,684,379 | 7/1954 | Guillissen et al. | 260—448.2 |
| 2,780,636 | 2/1957 | Wright et al. | 260—448.2 |
| 2,954,391 | 9/1960 | Riley et al. | 260—448.2 |
| 3,105,061 | 9/1963 | Bruner | 260—448.2 |

OTHER REFERENCES

Audrianov et al., "Doklady Adad. Nauk. SSSR", vol. 126, No. 5, (1959), pages 997–1000.

Eaborn, "Organosilican Compounds," Academic Press, Inc., New York, publisher (1960), page 237.

TOBIAS E. LEVOW, *Primary Examiner.*

SAMUEL H. BLECH, *Examiner.*

J. G. LEVITT, P. F. SHAVER, *Assistant Examiners.*